Aug. 22, 1944.   G. R. CUNNINGTON   2,356,225
DECORATED FABRIC
Filed Oct. 16, 1939   2 Sheets-Sheet 1

INVENTOR.
GEORGE R. CUNNINGTON
BY Whittemore, Hulbert
& Belknap   ATTORNEYS

Aug. 22, 1944.  G. R. CUNNINGTON  2,356,225
DECORATED FABRIC
Filed Oct. 16, 1939  2 Sheets-Sheet 2

*INVENTOR.*
GEORGE R. CUNNINGTON
BY Whittemore, Hulbert
& Belknap ATTORNEYS

Patented Aug. 22, 1944

2,356,225

UNITED STATES PATENT OFFICE 2,356,225

DECORATED FABRIC

George R. Cunnington, Grosse Pointe Park, Mich., assignor to National Automotive Fibres, Inc., Detroit, Mich., a corporation of Delaware Application October 16, 1939, Serial No. 299,728

7 Claims. (Cl. 154—2)

The present invention relates to decorated fabric and methods of forming the same, and more particularly to a decorated fabric provided at its forward surface with a high relief design resiliently retained therein by means of a relatively thin sheet of vulcanized rubber at the rear thereof. The present application is a continuation in part of my copending application, Serial No. 210,034, entitled "Decorative trim panel and fabric," filed May 25, 1938.

In my copending application identified above, I have disclosed the decoration of fabric by a method which includes the steps of abutting a thin sheet of unvulcanized rubber against the rear surface of the fabric to be decorated, followed by the application of pressure to designated areas in the front of the fabric in a manner to cause a molding of the rubber into forwardly projecting beads or risers intermediate the areas of pressure application. The present application refers more specifically to decorated fabrics in which the forwardly projecting decorative beads or risers are relatively large so that in the interests of economy and flexibility of the completed product it is desirable to provide what I term "hollow risers." By a hollow riser I refer to a riser in the fabric projecting forwardly toward the face of the fabric to provide a convex decorative bead at the forward face thereof, in which the bead or riser presents a corresponding concavity at the rear surface thereof.

Where beads and risers of this nature are supported by a hollow foundation of vulcanized rubber, it will be evident that they will exhibit qualities of resilience and softness, and will at the same time, due to the characteristics of vulcanized rubber, be strongly retained in the completed product.

It is accordingly an object of the present invention to provide a decorative fabric characterized by hollow risers in the fabric supported by a hollow shell of resilient vulcanized rubber.

It is a further object of the present invention to provide a decorated fabric having hollow risers supported against distortion due to tension in the fabric by means of a flexible reinforcing sheet material.

It is a further object of the present invention to provide a novel method for manufacturing the product described.

It is a further object of the present invention to provide a decorative fabric characterized by the presence of hollow risers by a method which comprises forming the fabric and a backing ply of unvulcanized rubber against a yielding support.

Other objects of the invention will be apparent as the description proceeds, and when taken in conjunction with the accompanying drawings wherein.

Broadly described, the method of decorating the fabric which forms the subject matter of the present application comprises the steps of abutting a ply of unvulcanized rubber against an area of a fabric to be decorated at the rear surface thereof. The combined fabric and rubber are then molded into predetermined shape, pressure being limited to areas of the fabric overlying the rubber, which in the completed product are to form depressed portions of the design. This is for the purpose of insuring that the balance of the design will not be modified in surface characteristics by a process. Thus for example if the material being decorated is a nap fabric such as mohair, it is important to avoid breaking down the nap except along portions of the design which are to be depressed. As will be evident, this accentuates the design and brings about an increased contrast between elevated and depressed portions thereof. Even though the fabric being decorated is not a nap fabric, it is still desirable to insure that the elevated portions of the design are not contacted with forming members.

Formation of the design in the fabric and rubber will be accomplished by employing a support having convex portions corresponding to desired elevated portions of the design. The forming member in the form of a die having die elements adapted to engage the fabric at points surrounding the convex elements of the support is employed. As a modification the die member may compress the fabric against a yielding support such for example as is formed of sponge rubber or a flexible envelope. In most cases it is preferable to supply heat for the purpose of vulcanizing the rubber from a surface in direct contact with the rubber. In the modification where the support is formed of a flexible envelope, the heat may be supplied therefrom by means of a heating fluid contained therein.

Figure 1:
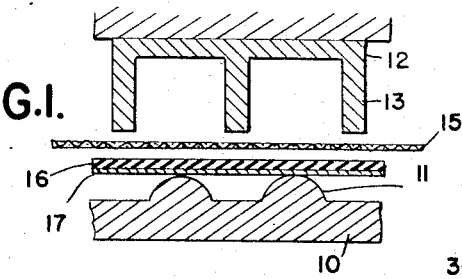
Figure 1 is a diagrammatic section illustrating one method of manufacture showing the forming elements in separated position.
Figure 2:
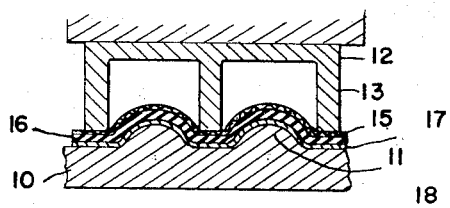
Figure 2 is a diagrammatic section similar to Figure 1 showing the forming elements in cooperating relation.

The method may be formed continuously by means of a heated drum in combination with cooperating forming members. In Figures 1 and 2 I have illustrated mechanism for carrying out one form of the invention. In these figures a lower supporting plate 10 is provided with a plurality of upstanding convex portions 11, which in this instance are illustrated as elongated so as to form elongated beads or risers in the completed fabric. Preferably the supporting plate 10 is provided with suitable heating elements (not shown). These heating elements may take the form of steam conduits, electrical resistance elements or the like.

Cooperating with the support 10 is a die 12 having a plurality of depending die elements 13. An inspection of Figures 1 and 2 shows that the die elements 13 are adapted to cooperate with the convex forming elements 11 in a manner to form the fabric and rubber thereover. It should be noted that the depending die elements 13 are adapted to contact the fabric 15 only at areas which are to be depressed areas in the completed fabric. The relatively elevated portions of the fabric 15 as clearly shown in Figure 2, are maintained throughout the process out of contact with any mechanical agents.

A relatively thin sheet 16 of unvulcanized rubber is employed in the method. The rubber should be of good quality, soft curing, and in the interest of economy in the method, it should be one which is adapted to cure with considerable rapidity. The thickness in the rubber may vary within wide limits. It will be appreciated that the results obtained depend in large part upon the thickness of the rubber and a thickness is selected which will give the desired degree of firmness to the risers without at the same time substantially or excessively reducing the flexibility of the completed product. At the same time, of course, it is desirable to use the minimum thickness of rubber which gives the desired result in order to avoid unnecessary expense.

In Figures 1 and 2 I have illustrated a sheet 16 as provided with a backing sheet 17. This backing sheet may be a paper or a woven fabric, and is provided primarily for preventing adhesion between surfaces of the rubber if it is supplied in roll form. In my copending application referred to above, this same sheeting serves an entirely different function, but in the present structure it may if desired be omitted.

When the die 12 is moved downwardly to form the fabric 15 and the sheet 16 of rubber over the upwardly projecting elements 11 of the support 10, the parts assume the relative position shown in Figure 2. It will be noted that the fabric and rubber are both deformed into hollow risers. The parts are maintained in this position for a sufficient interval of time to provide substantial vulcanization of the rubber. It will be understood that the unvulcanized rubber employed is easily shaped in the apparatus and that after being vulcanized, while retained in the formation shown, it tends to retain its shape. At the same time the vulcanized rubber is resilient, with the result that the risers in the completed product are soft to the touch, may be mechanically depressed for considerable intervals but will resume their initial formation upon release. The vulcanization of the rubber serves the dual function of causing the rubber to resiliently retain its predetermined formation, and at the same time provide a permanent bond between the fabric 15 and the upper surface of the rubber 16. This vulcanized bond, as will be appreciated, is accelerated along the lines formed by the die elements 13.

Figure 3:
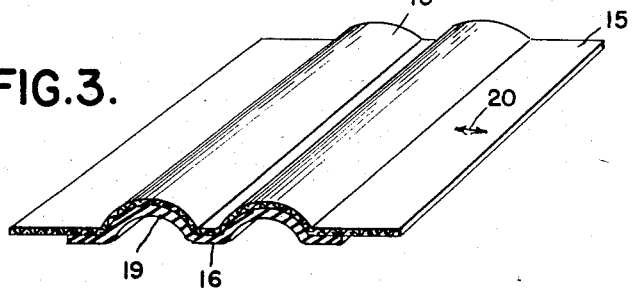
Figure 3 is a fragmentary perspective partly in section illustrating the product.

In Figure 3 I have illustrated a fragmentary perspective of the completed fabric. In this figure it will be noted that fabric 15 has upstanding beads or risers 18 formed therein and that the risers 18 are resiliently retained by a correspondingly shaped shell 19 of the rubber 16.

Figure 4:
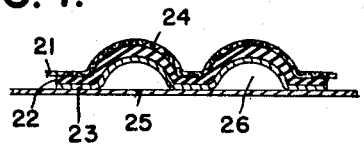
Figure 4 is a section through a portion of the decorated fabric illustrating the use of a reinforcing sheeting.

While, as previously described, the risers formed by the foregoing method resiliently tend to retain their deformed shape, it will be readily understood that if tension is applied to the fabric 15, for example in the direction of the arrows 20 in Figure 3, the bead will in large part disappear. In order to avoid this result and to provide a fabric which may be strongly tensioned in use without substantially reducing the effectiveness of the design, I employ the structure illustrated in Figure 4. In this figure the decorated fabric is designated at 21 and the resilient rubber shell at 22. In this figure I have also illustrated the sheeting 23 at the rear of the rubber, although, as will be understood, this may be omitted. In order to retain the beads 24, if the fabric is tensioned, I attach to the rear of the structure after vulcanization a sheeting 25 which is adhered to the rear of the rubber 22 at the low portions of the design leaving the hollow risers 24 open at their interior as indicated at 26. As will be evident, tension of the fabric 21 is transmitted through the reinforcing material 25 with the result that there is no substantial force tending to reduce the effectiveness of the riser 24.

Figure 5:
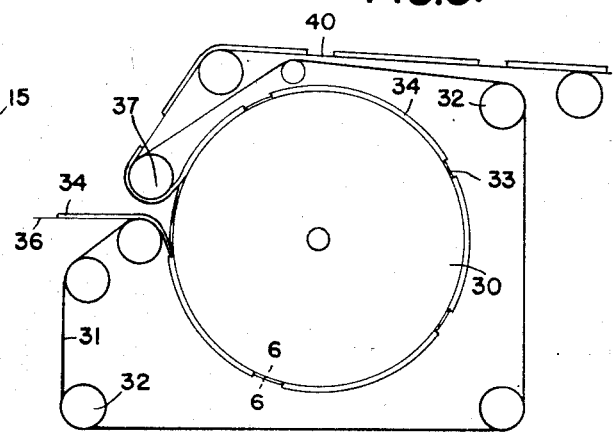
Figure 5 is a diagrammatic view illustrating the manufacture of my improved product by a continuous method.
Figure 6:
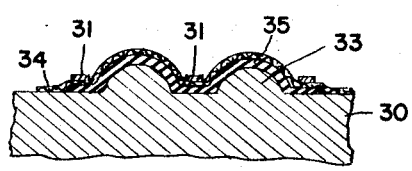
Figure 6 is a fragmentary section on the line 6—6 of Figure 5.

The methods previously described are illustrated as being carried out in individual presses. It is possible, however, to provide the decoration of the fabric in a continuous manner as diagrammatically illustrated in Figures 5 and 6. In these figures I have shown a rotatable drum 30 having a smooth cylindrical surface provided with circumferential convex forming members 33; a plurality of forming bands 31 are provided, being led around suitable rollers 32 as indicated. The forming bands 31 are shown in section in Figure 6, and it will be appreciated that they are arranged to cooperate with the forming members 33 of the drum in substantially the same manner as do the die elements 13. Instead of employing forming bands, I may employ a suitable chain forming member, or other means. It is appreciated that the forming bands 31 are maintained under sufficient tension to form the fabric 34 and the rubber 35 over the forming member 33 substantially as shown. In Figure 5 I have indicated a suitable conveyor 36 on which the assembled fabric 34 and rubber 35 are advanced, and it will be understood that the temperature of the drum 30, its size, and rate of rotation are selected so that substantial vulcanization takes place before the composite material leaves the drum at the roller 37. The completed fabric is advanced along a conveyor 40 in the completed form.

Figure 7:
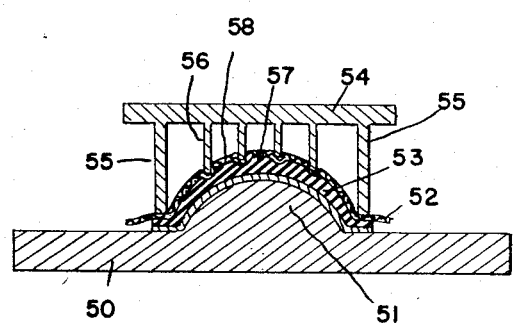
Figure 7 is a diagrammatic sectional view illustrating the method of manufacturing a somewhat modified form of my product.

In some instances it may be desirable to provide a detail decoration along the relatively large and high risers formed by the method as thus far described. In Figure 7 I have illustrated apparatus for carrying out a method which will produce this result. In this figure a support 50 is provided with a convex forming portion 51 over which the fabric 52 and unvulcanized rubber 53 are formed. The die member 54 in addition to the die elements 55 which form the composite fabric over the convex forming element 51 are provided with a plurality of smaller die elements 56. The die elements 56 are adapted to engage the fabric 52 and to depress the same in a manner to compress the rubber 53 therebeneath. Either the support 50 or the die elements 55 and 56 are heated. Preferably the heat is applied from the support 50 for the reason that by this method it is unnecessary to limit the temperatures to those which may be transferred through the fabric 52 without injury thereto. During the application of heat the rubber 53 initially softens and the rubber beneath the die elements 56 is displaced therefrom by a plastic flow forming intermediate thickened portions 57.

Figure 8:
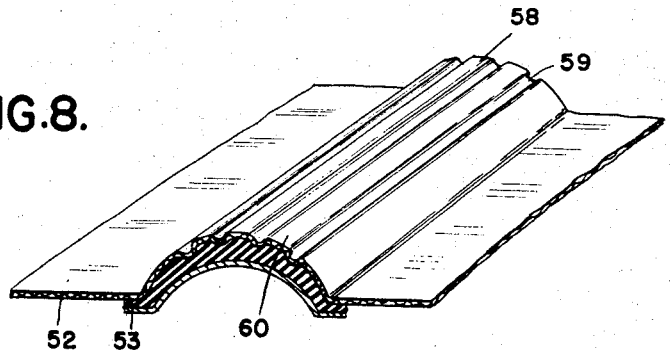
Figure 8 is a fragmentary perspective partly in section showing the product formed by the method illustrated in Figure 7.

The material which results from the practice of the method illustrated in Figure 7 is shown in a fragmentary perspective in Figure 8. In this figure the fabric 52 is shown as provided with a relatively large high riser 58, which in turn has formed therein grooves 59 and corresponding intermediate ridges 60. It will be noted that the shell of rubber 53 conforms generally to the outline of the large bead or riser 58, but that only its outer surface conforms to the grooves 59 and beads or ridges 60. It will be appreciated of course that the design need not be limited to the straight line elements illustrated but may instead assume any arbitrary or fanciful design desired.

Figure 9:
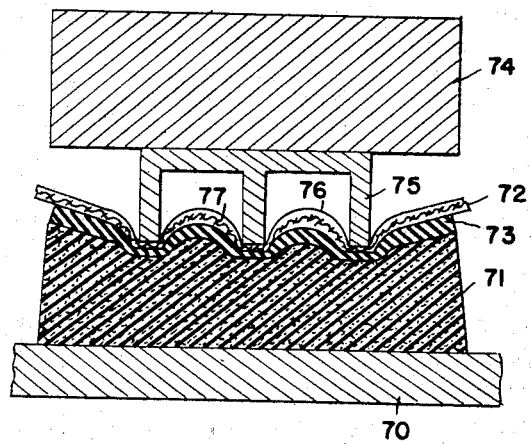
Figure 9 is a diagrammatic sectional view illustrating a modified method of forming the product.

In Figure 9 I have illustrated a somewhat different method of making the material. In this figure a lower supporting plate 70 has positioned thereon a block 71 of resilient or yielding material, such for example as vulcanized sponge rubber. The fabric 72 and the sheet of unvulcanized rubber 73 are placed thereover, after which a die 74, having depending relatively deep die elements 75 is moved downwardly to coact therewith, as illustrated in the figure. It will be apparent that the yielding material 71 is compressed, as shown, and that the rubber and fabric intermediate the die elements 75 are formed upwardly to provide upstanding beads or risers 76. It will also be seen that the rubber 73 directly beneath the die elements 75 is displaced to provide thicker portions 77 beneath the beads 76. In this instance it is necessary to provide the heat for vulcanizing the rubber through the die elements 75, and for this purpose suitable heating means (not shown) are provided which may take the form of steam conduits, electrical heating elements, or the like.

Figure 10:
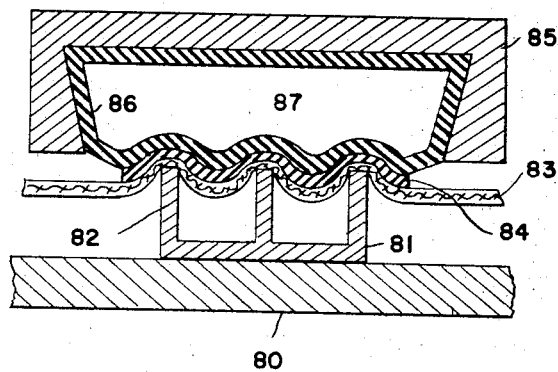
Figure 10 is a diagrammatic sectional view showing yet another method of forming the product.

A substantially similar method may be practiced with the apparatus illustrated in Figure 10, which differs from that shown in Figure 9 chiefly in that the yielding material is also adapted to supply the heat for vulcanization. In this figure I have illustrated a supporting plate 80 as carrying a die 81 having relatively deep die elements 82. The fabric 83 is abutted against the die elements 82 and the unvulcanized rubber 84 is placed against the rear surface of the fabric 83. A second supporting element 85, which is movable relative to the plate 80, is provided with a flexible envelope 86 which may be formed of vulcanized rubber. The envelope 86 is open at its interior and provides a space 87 through which a heating fluid may be circulated. It will be evident that the operation of this apparatus is substantially the same as that shown in Figure 8, with the exception that the heating for vulcanization is transferred from the envelope 86 directly to the rubber 84 without the necessity of transferring the same through the fabric 83.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. The method of providing a fabric with a raised, smoothly rounded bead which comprises applying a moldable, vulcanizable sheet material to the rear surface of said fabric, placing the assembly against a soft, yieldable support with said sheet material in contact with said support, pressing said fabric along spaced lines into said support, while leaving said fabric between said lines free for outward displacement, thereby shaping said fabric and sheet material outward from said support into a smoothly rounded, shallow bead between said lines, and heating said sheet material to vulcanize the same while retaining said assembly shaped as described.

2. The method of providing a fabric with a raised, smoothly rounded bead which comprises applying a moldable, vulcanizable sheet material to the rear surface of said fabric, placing the assembly against a hot, soft, yieldable support with said sheet material in contact with said support, pressing said fabric along spaced lines into said support, while leaving said fabric between said lines free for outward displacement, thereby shaping said fabric and sheet material outward from said support into a smoothly rounded, shallow bead between said lines, and heating said sheet material by heat supplied from said support to vulcanize the same while retaining said assembly shaped as described.

3. The method of providing a fabric with a raised, smoothly rounded bead which comprises applying a sheet of soft, uncured rubber to the rear surface of said fabric, placing the assembly against a soft, yieldable support with said rubber in contact with said support, applying pressure to certain separated areas of said fabric overlying said rubber while leaving said fabric free for relative outward displacement adjacent said separated areas in a manner to depress said fabric and rubber underneath said areas of pressure application into said support and to cause relative outward displacement of said rubber and fabric into smoothly rounded, hollow beads at areas between and adjacent said areas of pressure application, and vulcanizing said rubber while retaining said fabric and rubber shaped against said support.

4. The method of providing a fabric with a raised, smoothly rounded bead which comprises applying a moldable, vulcanizable sheet material to the rear surface of said fabric, placing the assembly against a hot, soft, yieldable support with said sheet material in contact with said support, pressing said fabric along spaced lines into said support, while leaving said fabric between said lines free for outward displacement, thereby shaping said fabric and sheet material outward from said support into a smoothly rounded, shallow bead between said lines, and heating said sheet material to vulcanize the same while retaining said assembly shaped as described by heat supplied from said support.

5. The method of providing a fabric with a hollow smoothly rounded riser which comprises applying a relatively thin vulcanizable sheet of rubber to the rear surface of said fabric, placing the assembly against a yieldable support with said sheet material in contact with said support, pressing said fabric along spaced lines against said support, while leaving said fabric between said lines free for outward displacement, thereby shaping said fabric and rubber sheet outward from said support into a smoothly rounded hollow riser between said lines, and heating said rubber sheet to vulcanize the same while retaining said assembly shaped as described.

6. The method of providing a fabric with a hollow smoothly rounded riser which comprises applying a relatively thin vulcanizable sheet of rubber to the rear surface of said fabric, placing the assembly against a yieldable part of a hollow die with said sheet of rubber in contact with said yieldable part, pressing spaced rigid elements of a die against said fabric toward the first mentioned die to displace inwardly thereof correspondingly spaced portions of said assembly and of the yieldable part of the first mentioned die while leaving a portion of the yieldable part of said first mentioned die between the rigid die elements free for outward displacement to shape the corresponding portion of said assembly between said rigid die elements into a smoothly rounded hollow riser, and introducing heat within the hollow die while retaining the assembly shaped as described to heat the rubber sheet of the assembly and thereby vulcanize the same to maintain the fabric in the shape described.

7. The method of providing a fabric with a hollow riser which comprises applying a vulcanizable sheet to the rear surface of said fabric, placing the assembly against a flexible part of a hollow die with said sheet in contact with said flexible part, pressing spaced rigid elements of a die against said fabric toward the first mentioned die to displace inwardly thereof correspondingly spaced portions of said assembly and of the flexible part of the first mentioned die while leaving a portion of the flexible part of said first mentioned die between the rigid die elements free for outward displacement to shape the corresponding portion of said assembly between said rigid die elements into a hollow riser, and subjecting the first mentioned die to heat while retaining the assembly shaped as described to vulcanize the sheet to maintain the fabric in the shape described.

GEORGE R. CUNNINGTON.